US012615093B2

(12) United States Patent
Bei et al.

(10) Patent No.: US 12,615,093 B2
(45) Date of Patent: Apr. 28, 2026

(54) COHERENT DETECTION METHOD AND APPARATUS, AND OPTICAL TRANSMISSION SYSTEM

(71) Applicant: ZTE CORPORATION, Shenzhen (CN)

(72) Inventors: Jingsong Bei, Shenzhen (CN); Zhengxuan Li, Shenzhen (CN); Yiming Zhong, Shenzhen (CN); Bo Yang, Shenzhen (CN); Yingxiong Song, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 232 days.

(21) Appl. No.: 18/264,667

(22) PCT Filed: Dec. 8, 2021

(86) PCT No.: PCT/CN2021/136541
§ 371 (c)(1),
(2) Date: Aug. 8, 2023

(87) PCT Pub. No.: WO2022/170839
PCT Pub. Date: Aug. 18, 2022

(65) Prior Publication Data
US 2024/0121006 A1      Apr. 11, 2024

(30) Foreign Application Priority Data
Feb. 9, 2021    (CN) .......................... 202110175242.4

(51) Int. Cl.
$H04B\ 10/60$      (2013.01)
$H04B\ 10/61$      (2013.01)
$H04B\ 10/64$      (2013.01)

(52) U.S. Cl.
CPC ....... *H04B 10/613* (2013.01); *H04B 10/6166* (2013.01); *H04B 10/60* (2013.01);
(Continued)

(58) Field of Classification Search
CPC .............. H04B 10/613; H04B 10/6166; H04B 10/614; H04B 10/65; H04B 10/61;
(Continued)

(56) References Cited

U.S. PATENT DOCUMENTS 6,535,289 B1 * 3/2003 Baney .................... H04B 10/64
                              356/484
7,346,279 B1 * 3/2008 Li .......................... H04B 10/40
                              398/32
(Continued)

FOREIGN PATENT DOCUMENTS

CN      101296042 A     10/2008
CN      103339882 A     10/2013
(Continued)

OTHER PUBLICATIONS

European Patent Office. Extended European Search Report for EP Application No. 20831624.0, mailed Jun. 20, 2024, pp. 1-10.
(Continued)

*Primary Examiner* — Dibson J Sanchez
(74) *Attorney, Agent, or Firm* — Vivacqua Crane, PLLC

(57) ABSTRACT

A coherent detection method and device, and an optical transmission system are disclosed. The method may include: acquiring an optical transmission signal and a local oscillator signal, where a frequency value of the local oscillator signal differs from a frequency value of the optical transmission signal by a preset offset frequency value, the preset offset frequency value being smaller than a symbol rate value of the optical transmission signal; obtaining a coupled signal according to the optical transmission signal and the
(Continued)

local oscillator signal; converting the coupled signal into an analog signal; sampling the analog signal according to a preset sampling frequency value and converting the analog signal into a plurality digital signals; and processing two digital signals among the plurality of digital signals so that a phase difference between the two digital signals to is 90 degrees.

15 Claims, 7 Drawing Sheets

(52) U.S. Cl.
CPC ............ *H04B 10/61* (2013.01); *H04B 10/616* (2013.01); *H04B 10/6164* (2013.01); *H04B 10/64* (2013.01)

(58) Field of Classification Search
CPC .. H04B 10/6165; H04B 10/60; H04B 10/616; H04B 10/6164; H04B 10/64
USPC .................................................. 398/202–214
See application file for complete search history.

(56) References Cited

U.S. PATENT DOCUMENTS

| | | | | |
|---|---|---|---|---|
| 7,826,752 | B1 * | 11/2010 | Zanoni ................... | H04B 10/60 |
| | | | | 398/186 |
| 9,209,908 | B2 | 12/2015 | Yu et al. | |
| 2008/0267638 | A1 | 10/2008 | Nakashima et al. | |
| 2009/0047030 | A1 * | 2/2009 | Hoshida ................. | H04B 10/61 |
| | | | | 398/205 |
| 2009/0245815 | A1 * | 10/2009 | Zhang .................... | H04B 10/61 |
| | | | | 398/208 |
| 2011/0085797 | A1 * | 4/2011 | Xu ..................... | H04B 10/6164 |
| | | | | 398/202 |
| 2011/0229127 | A1 * | 9/2011 | Sakamoto .......... | H04B 10/6165 |
| | | | | 398/25 |
| 2012/0057863 | A1 * | 3/2012 | Winzer .................. | H04B 10/60 |
| | | | | 398/1 |
| 2012/0134676 | A1 * | 5/2012 | Kikuchi .................. | H04J 14/06 |
| | | | | 398/65 |
| 2012/0237202 | A1 | 9/2012 | Abe et al. | |
| 2013/0202303 | A1 * | 8/2013 | Wilkinson .......... | H04L 27/3818 |
| | | | | 398/76 |
| 2014/0328588 | A1 * | 11/2014 | Sakai ................. | H04B 10/6164 |
| | | | | 398/140 |
| 2014/0328602 | A1 | 11/2014 | Sakamoto et al. | |
| 2016/0164624 | A1 * | 6/2016 | Yamauchi .......... | H04B 10/0797 |
| | | | | 398/34 |
| 2017/0222716 | A1 * | 8/2017 | Nakashima ............ | H04B 10/25 |
| 2017/0294972 | A1 * | 10/2017 | Rohde .................... | H04B 10/63 |
| 2019/0229811 | A1 * | 7/2019 | Gupta .................. | H04B 10/614 |
| 2019/0319712 | A1 * | 10/2019 | Zhang ................ | H04B 10/5161 |
| 2021/0135762 | A1 * | 5/2021 | Zhou .................. | H04B 10/5561 |
| 2021/0203421 | A1 * | 7/2021 | Koga ................. | H04B 10/6165 |
| 2022/0140913 | A1 * | 5/2022 | Yamanaka ............ | H04B 10/61 |
| | | | | 359/341.41 |
| 2023/0155688 | A1 * | 5/2023 | Cavaliere ............. | H04B 10/614 |
| | | | | 398/204 |

FOREIGN PATENT DOCUMENTS

| | | |
|---|---|---|
| CN | 106716877 A | 5/2017 |
| CN | 108418639 A | 8/2018 |
| CN | 109075866 A | 12/2018 |
| CN | 110278036 A | 9/2019 |
| JP | 2009027442 A | 2/2009 |
| WO | 2016050073 A1 | 4/2016 |

OTHER PUBLICATIONS

International Searching Authority. International Search Report and Written Opinion for PCT Application No. PCT/CN2021/136541 and English translation, mailed Feb. 28, 2022, pp. 1-11.

\* cited by examiner

Flo-Fs = Rsymbol/2

T = 1/(2Rsymbol）

Perform beam splitting processing on the first optical source signal to obtain the optical transmission signal including a first optical signal and a second optical signal, where the polarization state of the first optical signal is orthogonal to the polarization state of the second optical signal

Perform beam splitting processing on the local oscillator signal to obtain a first local oscillator signal and a second local oscillator signal, where the polarization state of the first local oscillator signal is orthogonal to the polarization state of the second local oscillator signal

Receive an optical source signal, which is a combined optical signal obtained through optical combination of the optical transmission signal and the local oscillator signal

S710

Perform beam splitting processing on the optical source signal to obtain the optical transmission signal and the local oscillator signal

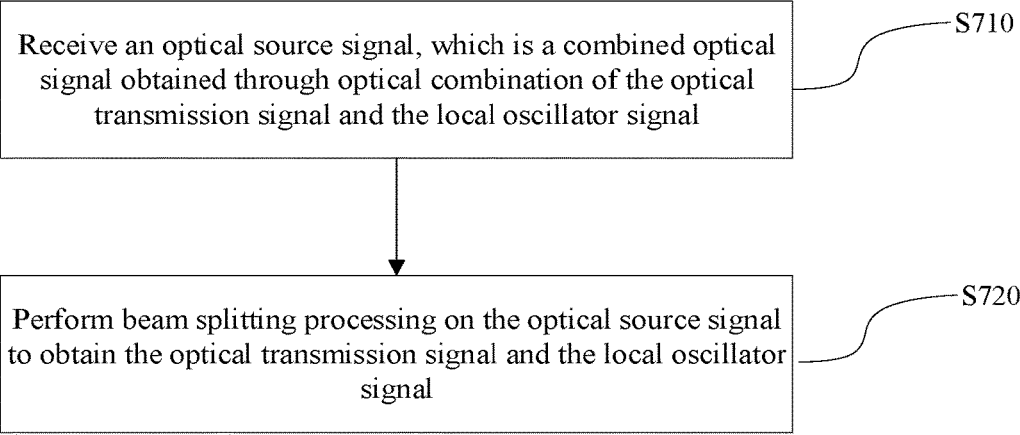

COHERENT DETECTION METHOD AND APPARATUS, AND OPTICAL TRANSMISSION SYSTEM

CROSS-REFERENCE TO RELATED APPLICATION

This application is a national stage filing under 35 U.S.C. § 371 of international application number PCT/CN2021/136541, filed Dec. 8, 2021, which claims priority to Chinese patent application No. 202110175242.4 filed Feb. 9, 2021. The contents of these applications are incorporated herein by reference in their entirety.

TECHNICAL FIELD

Embodiments of the present disclosure relate to, but are not limited to, the field of optical communications and, in particular, to a coherent detection method and device, and an optical transmission system.

BACKGROUND

At present, the number of intelligent terminal equipment in the market is increasing rapidly, and the types of services supported by intelligent terminal equipment are gradually becoming diversified, such as high-definition video-on-demand, real-time online games, cloud computing and cloud storage, and the like, which require large amounts of data transmission, and the demand for network bandwidth is increasing day by day. At present, the optical fiber access system is mainly composed of a passive optical network structure, which includes a coherent detection system, for example, a homodyne detection system that at least includes two pairs of balanced detectors, and in particular, when the homodyne detection system requires polarization diversity reception of the signal, the number of balanced detectors in the homodyne detection system needs to be doubled, thus leading to a higher cost of the homodyne detection system; and for another example, in the case of single polarization state reception for the coherent detection system, the phase noise produced in the coherent detection system will have a serious impact on the received signal, thus resulting in the need for complex algorithms to recover the original signal in the digital signal processing process. Therefore, there is an urgent need for a coherent detection scheme with low computational complexity, low equipment complexity and low equipment cost.

SUMMARY

Embodiments of the present disclosure provides a coherent detection method and device, and an optical transmission system.

In accordance with a first aspect of the present disclosure, an embodiment provides a coherent detection method applied to a coherent detection device, the method may include: acquiring an optical transmission signal and a local oscillator signal, where a frequency value of the local oscillator signal differs from a frequency value of the optical transmission signal by a preset offset frequency value, the preset offset frequency value being smaller than a symbol rate value of the optical transmission signal; obtaining a coupled signal according to the optical transmission signal and the local oscillator signal; converting the coupled signal into an analog signal; sampling the analog signal according to a preset sampling frequency value and converting the analog signal into a plurality of digital signals; and processing two digital signals among the plurality of digital signals so that a phase difference between the two digital signals is 90 degrees, where the two digital signals are derived from the same signal symbol in the optical transmission signal.

In accordance with a second aspect of the present disclosure, an embodiment provides a coherent detection device, the device may include: an optical coupling module configured to acquire an optical transmission signal and a local oscillator signal and obtain a coupled signal according to the optical transmission signal and the local oscillator signal, where a frequency value of the local oscillator signal differs from a frequency value of the optical transmission signal by a preset offset frequency value, the preset offset frequency value being smaller than a symbol rate value of the optical transmission signal; an optoelectronic detection module connected to the optical coupling module and configured to convert the coupled signal into an analog signal; an analog-to-digital conversion module connected to the optoelectronic detection module and configured to sample the analog signal according to a preset sampling frequency value and convert the analog signal into a plurality of digital signals; and a digital processing module connected to the analog-to-digital conversion module and configured to process two digital signals among the plurality of digital signals so that a phase difference between the two digital signals is 90 degrees, where the two digital signals are derived from the same signal symbol in the optical transmission signal.

In accordance with a third aspect of the present disclosure, an embodiment further provides an optical transmission system, the system may include a coherent detection device as described in the second aspect.

BRIEF DESCRIPTION OF DRAWINGS

FIG. 5 is a flowchart of beam splitting processing of an optical source signal in a coherent detection method provided by an embodiment of the present disclosure;

FIG. 6 is a flowchart of beam splitting processing of a local oscillator signal in a coherent detection method according to an embodiment of the present disclosure;

FIG. 7 is a flowchart of beam splitting processing of an optical source signal in a coherent detection method provided by an embodiment of the present disclosure;

FIG. 8 is a schematic diagram of a coherent detection device provided by an embodiment of the present disclosure;

DETAILED DESCRIPTION

Figure 1:
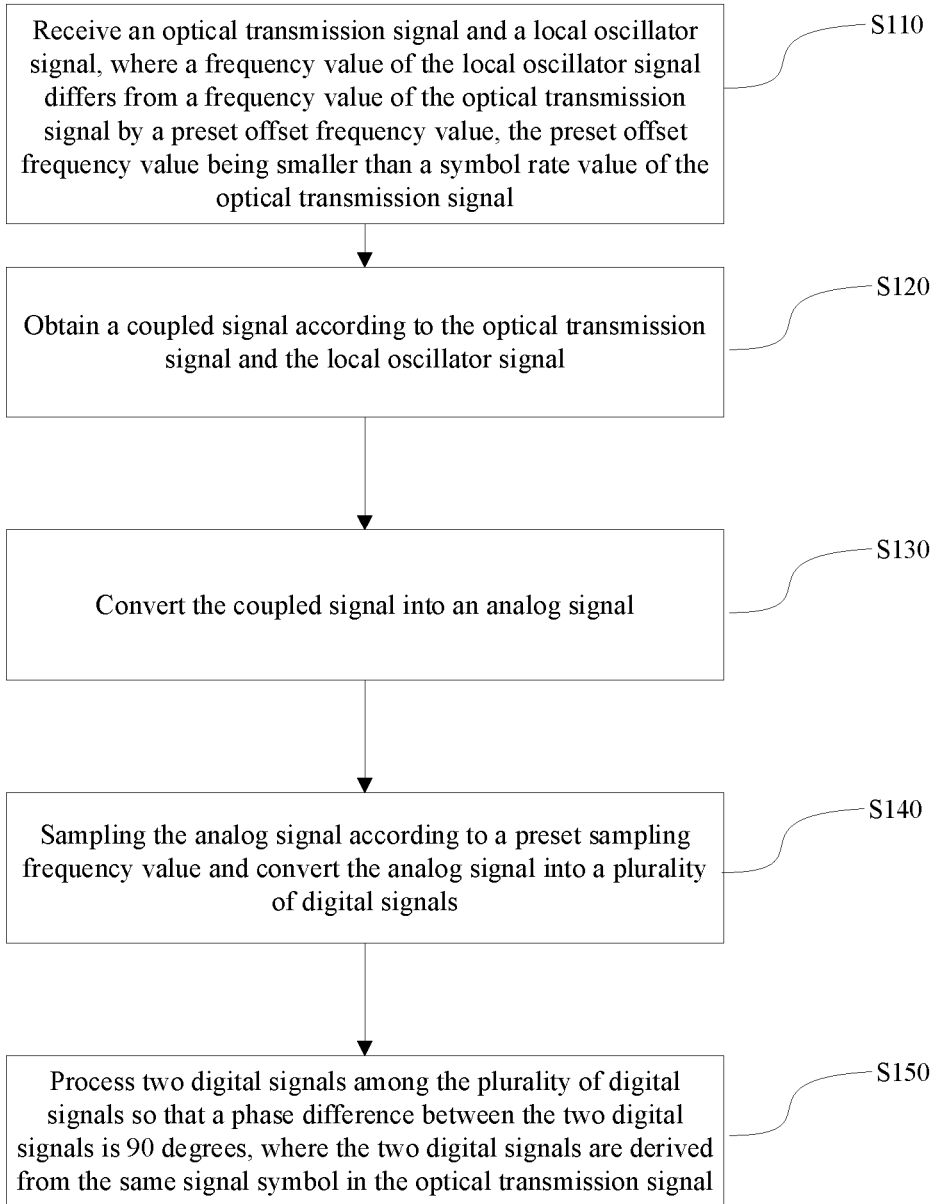
FIG. 1 is a flowchart of a coherent detection method provided by an embodiment of the present disclosure.

In order to make the objectives, technical schemes and advantages of the present disclosure more apparent, the present disclosure is further described in detail in conjunction with the accompanying drawings and embodiments. It should be understood that the particular embodiments described herein are only intended to explain the present disclosure, and are not intended to limit the present disclosure.

It is to be noted that although a functional module division is shown in a schematic diagram of a device and a logical order is shown in a flowchart, the steps shown or described may be executed, in some cases, in a different module division from that of the device or in a different order from that in the flowchart. The terms "first", "second", etc. in the description, the claims and the above-mentioned drawings are intended to distinguish between similar objects and are not necessarily to describe a specific order or sequence.

This embodiment provides a coherent detection method and device and an optical transmission system, where the coherent detection method includes: acquiring an optical transmission signal and a local oscillator signal, where a frequency value of the local oscillator signal differs from a frequency value of the optical transmission signal by a preset offset frequency value, the preset offset frequency value being smaller than a symbol rate value of the optical transmission signal; obtaining a coupled signal according to the optical transmission signal and the local oscillator signal; converting the coupled signal into an analog signal; sampling the analog signal according to a preset sampling frequency value and converting the analog signal into a plurality of digital signals; and processing two digital signals among the plurality of digital signals so that a phase difference between the two digital signals is 90 degrees, where the two digital signals are derived from the same signal symbol in the optical transmission signal. Since the frequency value of the local oscillator signal differs from the frequency value of the optical transmission signal by the preset offset frequency value and the preset offset frequency value is smaller than the symbol rate value of the optical transmission signal so that the coupled signal coupled from the local oscillator signal and the optical transmission signal has values on both the in-phase component and the quadrature component, when the analog signal converted from the coupled signal is sampled according to the preset sampling frequency, a plurality of digital signals can be obtained, and two digital signals of which the phase difference is close to or equal to 90 degrees in the same symbol among the plurality of digital signals can be processed, and when the phase difference between the two digital signals in the same symbol does not meet the condition of 90 degrees, the phase difference between the two digital signals converted from the two analog signals in the same symbol can be adjusted to 90 degrees, and the demodulation is completed; and if the phase difference between the two digital signals in the same symbol is 90 degrees, the two digital signals can be demodulated directly. By replacing the phase diversity approach with a time division approach, this coherent detection method can effectively reduce the computational complexity, and can simplify the structural complexity of the equipment and reduce the cost of the equipment.

The embodiments of the present disclosure will be further elaborated below with reference to the accompanying drawings.

As shown in FIG. 1, which FIG. 1 is a flowchart of a coherent detection method in an embodiment, the coherent detection method includes, but is not limited to, steps S110 to S150.

At S110, an optical transmission signal and a local oscillator signal are received, where a frequency value of the local oscillator signal differs from a frequency value of the optical transmission signal by a preset offset frequency value, the preset offset frequency value being smaller than a symbol rate value of the optical transmission signal;

at S120, a coupled signal is obtained according to the optical transmission signal and the local oscillator signal;

at S130, the coupled signal is converted into an analog signal;

at S140, the analog signal is sampled according to a preset sampling frequency value and the analog signal is converted into a plurality of digital signals; and at S150, two digital signals among the plurality of digital signals are processed so that a phase difference between the two digital signals is 90 degrees, where the two digital signals are derived from the same signal symbol in the optical transmission signal.

In an embodiment, an optical transmission signal and a local oscillator signal (the frequency value of the local oscillator signal differs from the frequency value of the optical transmission signal by a preset offset frequency value, the preset offset frequency value being smaller than a symbol rate value of the optical transmission signal) are acquired, a coupled signal is obtained according to the optical transmission signal and the local oscillator signal, then the coupled signal is converted into an analog signal, and the analog signal is sampled according to a preset sampling frequency value to obtain a plurality of digital signals, and then two digital signals among the plurality of digital signals (the two digital signals are derived from the same signal symbol in the optical transmission signal) are processed so that the phase difference between the two digital signals is 90 degrees, and the two digital signals are demodulated. Since the frequency value of the local oscillator signal differs from the frequency value of the optical transmission signal by the preset offset frequency value and the preset offset frequency value is smaller than the symbol rate value of the optical transmission signal so that the coupled signal coupled from the local oscillator signal and the optical transmission signal has values on both the in-phase component and the quadrature component, when the analog signal converted from the coupled signal is sampled according to the preset sampling frequency, a plurality of digital signals can be obtained, and two digital signals in the same symbol can be processed, and when the phase difference between the two digital signals in the same symbol does not meet the condition of 90 degrees, the phase difference between the two digital signals converted from the two analog signals in the same symbol can be adjusted to 90 degrees, and the demodulation is completed; and if the phase difference between the two digital signals in the same symbol is 90 degrees, the two digital signals can be demodulated directly. By replacing the phase diversity approach with a time division approach, this coherent detection method can effectively reduce the computational complexity, and can simplify the structural complexity of the equipment and reduce the cost of the equipment.

It is to be noted that the preset sampling frequency value may be greater than twice the symbol rate value of the optical transmission signal or equal to twice the symbol rate value of the optical transmission signal, which is not specifically limited in this embodiment.

Figure 2:
FIG. 2 is a schematic diagram of a frequency offset approach between a received optical transmission signal and a local oscillator signal according to a coherent detection method provided by another embodiment of the present disclosure.
Figure 3:
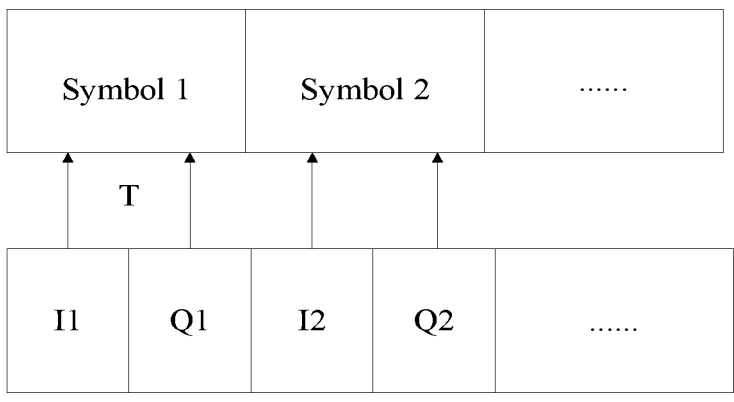
FIG. 3 is a schematic diagram of a sampling period of a coherent detection method provided by another embodiment of the present disclosure.

Referring to FIG. 2, assuming that the symbol rate of the optical transmission signal Ot is $R_{symbol}$, then by adjusting the central wavelength of the local oscillator signal Olo, a fixed preset frequency offset value ($R_{symbol}/2$) can be enabled to exist between the local oscillator signal Olo and the optical transmission signal Ot, and the analog signal Es output from the optoelectronic detector can be sampled by the preset offset frequency value as illustrated in FIG. 3, where the preset sampling frequency value is set to be twice ($2R_{symbol}$) of the symbol rate value of the optical transmission signal Ot, which means that the sampling period T is $\frac{1}{2}R_{symbol}$.

Then two consecutive sampled analog signals Es can be represented by the following equations:

$$I_n = 2R\sqrt{P_S P_{LO}} \cos\{\alpha + 2\pi n\Delta fT + \theta\}$$

$$I_{n+1} = 2R\sqrt{P_S P_{LO}} \cos\{\alpha + 2\pi(n+1)\Delta fT + \theta\}$$

$$= 2R\sqrt{P_S P_{LO}} \cos\{\alpha + 2\pi n\Delta fT + \theta + 2\pi\Delta fT\}$$

$$= 2R\sqrt{P_S P_{LO}} \cos\{\alpha + 2\pi n\Delta fT + \theta + \pi/2\}$$

$$= 2R\sqrt{P_S P_{LO}} \sin\{\alpha + 2\pi n\Delta fT + \theta\}$$

where R denotes the responsiveness of the optoelectronic detector, $P_S$ denotes the power of the optical transmission signal Ot, $P_{LO}$ denotes the power of the local oscillator signal Olo, $\alpha$ denotes the modulation phase of the optical transmission signal Ot, which can use an intensity-modulated format signal, and then $\alpha$ is zero at this point, $\Theta$ denotes the phase noise, and $2\pi n\Delta fT$ denotes the phase offset due to the frequency offset that exists between the local oscillator signal Olo and the optical transmission signal Ot. From the above equation, it can be derived that the phase difference between the sequentially sampled analog signals Es is $$2\pi\Delta fT = 2\pi \times \frac{1}{2R_{symbol}} \times \frac{R_{symbol}}{2} = \frac{\pi}{2},$$

which means that the two sequentially sampled analog signals Es are the in-phase component (I1, I2) and the quadrature component (Q1, Q2) of the same symbol, and then this symbol can be expressed by these two sequentially sampled analog signals Es:

$$S_k = I_n + jI_{n+1}$$

Therefore, in the case where the frequency value Flo of the local oscillator signal Olo differs from the frequency value Ft of the optical transmission signal Ot by a preset offset frequency value and the preset offset frequency value is half of the symbol rate value of the optical transmission signal Ot, when the combined optical signal composed of the local oscillator signal Olo and the optical transmission signal Ot is sampled by a preset sampling frequency value of twice the symbol rate value of the optical transmission signal Ot, a 90-degree phase difference can be enabled to exist between every two sampled analog signals Es, and every two sampled analog signals Es are the in-phase component (I1, I2) and the quadrature component (Q1, Q2) of the optical transmission signal Ot, and the digital signals Ed converted from the sampled analog signals Es can be processed to complete the demodulation of the optical transmission signal Ot. By replacing the phase diversity approach with a time division approach, this coherent detection method can effectively reduce the computational complexity, and can simplify the structural complexity of the equipment and reduce the cost of the equipment.

It is to be noted that the preset offset frequency value by which the frequency value Flo of the local oscillator signal Olo differs from the frequency value Ft of the optical transmission signal Ot may be $$\pm \frac{R_{symbol}}{2}.$$

It is to be noted that in the embodiments, the in-phase component (I1, I2) and the quadrature component (Q1, Q2) of each symbol are derived from two adjacent sampled analog signals Es, and if an additional frequency drift is incurred during the sampling process, the problem of unbalance between the in-phase component (I1, I2) and the quadrature component (Q1, Q2) of the optical transmission signal Ot can arise.

The unbalance between the in-phase component (I1, I2) and the quadrature component (Q1, Q2) of the symbol of the optical transmission signal Ot caused by the frequency drift can be expressed by the following equations:

$$I_k = I_{2n} = A\cos\{2\pi 2n\Delta f'T + \theta\}$$

$$Q_k = I_{2n+1} = A\cos\{2\pi 2n\Delta f'T + \theta + 2\pi\Delta f'T\}$$

$$= A\cos\{2\pi 2n\Delta f'T + \theta + \theta + \pi/2\}$$

$$= A\sin\{2\pi 2n\Delta f'T + \theta + \vartheta\}$$

The equations are the in-phase component (I1, I2) and the quadrature component (Q1, Q2) of the symbol of the kth received optical transmission signal Ot, where A is the signal strength, T denotes the sampling period, $\theta$ denotes the phase noise, and Δf' is the cumulative phase offset due to the frequency offset. The phase offset that exists between the in-phase component (I1, I2) and the quadrature component (Q1, Q2) of the same symbol in the optical transmission signal Ot is $2\pi\Delta f'T$, and since Δf' is not equal to ($R_{symbol}/2$) due to the frequency offset, which means that the phase difference between the in-phase component (I1, I2) and the quadrature component (Q1, Q2) of the same symbol is not π/2, then there exists an additional angle of unbalance ϑ between the in-phase component (I1, I2) and the quadrature component (Q1, Q2). The angle of unbalance ϑ existing between the in-phase component (I1, I2) and the quadrature component (Q1, Q2) can be eliminated using the Schmidt orthogonalization algorithm.

It is to be noted that, in this embodiment, the preset offset frequency value is half of the symbol rate value of the optical transmission signal, and the preset sampling frequency value is equal to twice the symbol rate value of the optical transmission signal, which is only one of the embodiments of the present disclosure. No uniqueness limitation is imposed on the preset offset frequency value and the preset sampling frequency value in this embodiment, and as long as the preset offset frequency value is smaller than the symbol rate value of the optical transmission signal and the preset sampling frequency value is greater than or equal to twice the symbol rate value of the optical transmission signal, all of them fall within the scope of protection of this embodiment.

Figure 4:
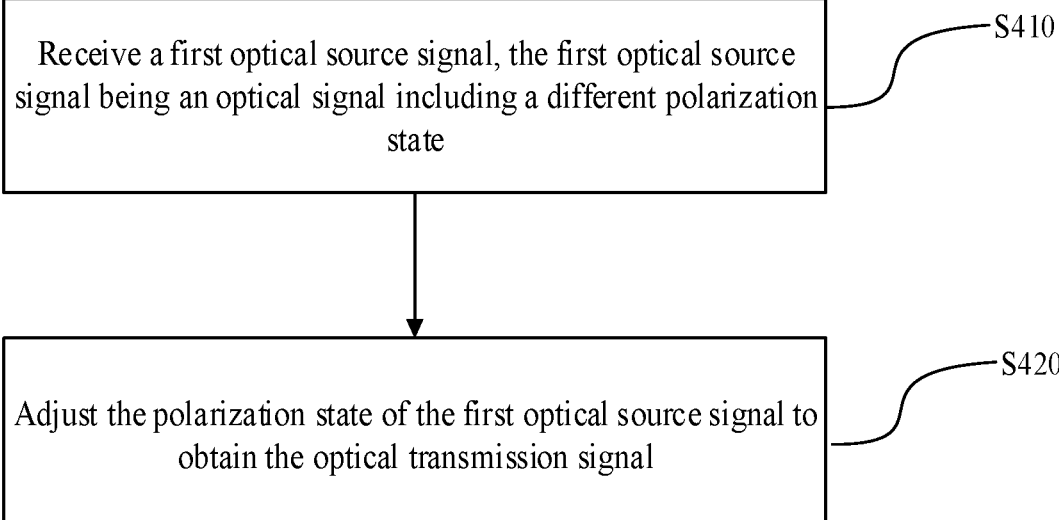
FIG. 4 is a flowchart of adjusting the polarization state of an optical source signal in a coherent detection method provided by an embodiment of the present disclosure.

Referring to FIG. 4, in an embodiment, before S110, the method further includes, but is not limited to, the following steps.

At S410, a first optical source signal is received, the first optical source signal being an optical signal including a different polarization state; and at S420, the polarization state of the first optical source signal is adjusted to obtain the optical transmission signal.

In an embodiment, after receiving the first optical source signal sent by the transmitting end, if the polarization state of the optical source signal is not equal to the polarization state of the local oscillator signal, the polarization state of the received optical source signal is adjusted to obtain the optical transmission signal of which the polarization state is equal to the polarization state of the local oscillator signal. Then, the optical transmission signal and the local oscillator signal (the frequency value of the local oscillator signal differs from the frequency value of the optical transmission signal by a preset offset frequency value, the preset offset frequency value being smaller than a symbol rate value of the optical transmission signal) are acquired, a coupled signal is obtained according to the optical transmission signal and the local oscillator signal, then the coupled signal is converted into an analog signal, and the analog signal is sampled according to a preset sampling frequency value to obtain a plurality of digital signals, and then two digital signals among the plurality of digital signals (the two digital signals are derived from the same signal symbol in the optical transmission signal) are processed so that the phase difference between the two digital signals is 90 degrees, and the two digital signals are demodulated. Since the frequency value of the local oscillator signal differs from the frequency value of the optical transmission signal by the preset offset frequency value and the preset offset frequency value is smaller than the symbol rate value of the optical transmission signal so that the coupled signal coupled from the local oscillator signal and the optical transmission signal has values on both the in-phase component and the quadrature component, when the analog signal converted from the coupled signal is sampled according to the preset sampling frequency, a plurality of digital signals can be obtained, and two digital signals in the same symbol among the plurality of digital signals can be processed, and when the phase difference between the two digital signals in the same symbol does not meet the condition of 90 degrees, the phase difference between the two digital signals converted from the two analog signals in the same symbol can be adjusted to 90 degrees, and the demodulation is completed; and if the phase difference between the two digital signals in the same symbol is 90 degrees, the two digital signals can be demodulated directly. By replacing the phase diversity approach with a time division approach, this coherent detection method can effectively reduce the computational complexity, and can simplify the structural complexity of the equipment and reduce the cost of the equipment.

Referring to FIG. 5, in an embodiment, before S110, the method further includes, but is not limited to, the following step.

At S510, beam splitting processing is performed on the first optical source signal to obtain the optical transmission signal including a first optical signal and a second optical signal, where the polarization state of the first optical signal is orthogonal to the polarization state of the second optical signal.

In an embodiment, beam splitting processing is performed on the received optical source signal to obtain the optical transmission signal that includes a first optical signal and a second optical signal, where the polarization state of the first optical signal is orthogonal to the polarization state of the second optical signal, thereby making it possible to prepare for the subsequent step of signal coupling.

It is to be noted that the first optical signal and the second optical signal may be two different optical signals, and the first optical signal and the second optical signal are not specifically limited in this embodiment.

Referring to FIG. 6, in an embodiment, on the basis of the flowchart of the coherent detection method of FIG. 5, after S110, the method further includes, but is not limited to, the following step.

At S610, beam splitting processing is performed on the local oscillator signal to obtain a first local oscillator signal and a second local oscillator signal, where the polarization state of the first local oscillator signal is orthogonal to the polarization state of the second local oscillator signal.

In an embodiment, beam splitting processing is performed on the local oscillator signal to obtain a first local oscillator signal and a second local oscillator signal, where the polarization state of the first local oscillator signal is orthogonal to the polarization state of the second local oscillator signal, where the polarization state of the first optical signal is equal to the polarization state of the first local oscillator signal, and the polarization state of the second optical signal is equal to the polarization state of the second local oscillator signal, thereby making it possible to prepare for the subsequent steps of coupling the first optical signal to the first local oscillator signal and coupling the second optical signal to the second local oscillator signal.

Referring to FIG. 7, in an embodiment, if the optical source signal is a combined optical signal obtained through optical combination of the optical transmission signal and the local oscillator signal, before step S110, the method includes, but is not limited to, the following steps.

At S710, an optical source signal is received, which is a combined optical signal obtained through optical combination of the optical transmission signal and the local oscillator signal; and At S720, beam splitting processing is performed on the optical source signal to obtain the optical transmission signal and the local oscillator signal.

In an embodiment, an optical source signal is received, which is a combined optical signal obtained through optical combination of the optical transmission signal and the local oscillator signal, then beam splitting processing may be performed on the optical source signal so that the optical source signal is divided into the optical transmission signal and the local oscillator signal. Then, the optical transmission signal and the local oscillator signal (the frequency value of the local oscillator signal differs from the frequency value of the optical transmission signal by a preset offset frequency value, the preset offset frequency value being smaller than a symbol rate value of the optical transmission signal) are acquired, a coupled signal is obtained according to the optical transmission signal and the local oscillator signal, then the coupled signal is converted into an analog signal, and the analog signal is sampled according to a preset sampling frequency value to obtain a plurality of digital signals, and then two digital signals among the plurality of digital signals (the two digital signals are derived from the same signal symbol in the optical transmission signal) are processed so that the phase difference between the two digital signals is 90 degrees, and the two digital signals are demodulated. Since the frequency value of the local oscillator signal differs from the frequency value of the optical transmission signal by the preset offset frequency value and the preset offset frequency value is smaller than the symbol rate value of the optical transmission signal so that the coupled signal coupled from the local oscillator signal and the optical transmission signal has values on both the in-phase component and the quadrature component, when the analog signal converted from the coupled signal is sampled according to the preset sampling frequency, a plurality of digital signals can be obtained, and two digital signals in the same symbol among the plurality of digital signals can be processed, and when the phase difference between the two digital signals in the same symbol does not meet the condition of 90 degrees, the phase difference between the two digital signals converted from the two analog signals in the same symbol can be adjusted to 90 degrees, and the demodulation is completed; and if the phase difference between the two digital signals in the same symbol is 90 degrees, the two digital signals can be demodulated directly. By replacing the phase diversity approach with a time division approach, this coherent detection method can effectively reduce the computational complexity, and can simplify the structural complexity of the equipment and reduce the cost of the equipment.

As shown in FIG. 8, which FIG. 8 is a schematic diagram of a coherent detection device in an embodiment, the coherent detection device is configured to demodulate a modulated optical source signal Os transmitted by the optical signal transmitting device; and the coherent detection device may include an optical coupling module 810, an optoelectronic detection module 820, an analog-to-digital conversion module 830, and a digital processing module 840 connected in sequence, where the optical coupling module 810 is configured to receive an optical transmission signal Ot and a local oscillator signal Olo, and to obtain a coupled signal Om according to the optical transmission signal Ot and the local oscillator signal Olo, where the frequency value of the local oscillator signal Olo differs from the frequency value of the optical transmission signal Ot by a preset offset frequency value, the preset offset frequency value being smaller than a symbol rate value of the optical transmission signal Ot; the optoelectronic detection module 820 is configured to convert the coupled signal Om into an analog signal Es; the analog-to-digital conversion module 830 is configured to sample the analog signal Es according to a preset sampling frequency value and convert the analog signal Es into a plurality of digital signals Ed; and the digital processing module 840 is configured to process two digital signals Ed of the plurality of digital signals Ed so that a phase difference between the two digital signals Ed is 90 degrees, where the two digital signals Ed are derived from the same signal symbol in the optical transmission signal Ot. Since the frequency value of the local oscillator signal Olo differs from the frequency value of the optical transmission signal Ot by the preset offset frequency value and the preset offset frequency value is smaller than the symbol rate value of the optical transmission signal Ot, when the analog signal Es converted from the coupled signal Om is sampled according to the preset sampling frequency value, a plurality of digital signals Ed can be obtained, and two digital signals Ed of which the phase difference is close to or equal to 90 degrees in the same symbol can be processed, and when the phase difference between the two digital signals Ed in the same symbol does not meet the condition of 90 degrees, the digital processing module 840 can adjust the phase difference between the two digital signals Ed converted from the two analog signals Es in the same symbol to 90 degrees, and complete the demodulation; and if the phase difference between the two digital signals Ed in the same symbol is 90 degrees, the digital processing module 840 can directly demodulate the two digital signals Ed. By replacing the phase diversity approach with a time division approach in this coherent detection device, the coherent detection device has the advantages of low equipment complexity, low equipment cost and low computational complexity.

It is to be noted that if the phase difference of two digital signals Ed in the same symbol received by the digital processing module 840 satisfies the condition of 90 degrees, the digital processing module 840 can directly demodulate the two digital signals Ed without adjusting the phases of the two digital signals Ed.

It is to be noted that the digital processing module 840 can be configured to adjust the phases of the digital signals Ed, can be configured to demodulate the sampled digital signals Ed, can be configured to perform IQ orthogonalization processing on the digital signals Ed, can be configured to perform clock recovery processing on the digital signals Ed, can be configured to perform dispersion compensation processing on the digital signals Ed, can be configured to perform frequency offset estimation processing on the digital signals Ed, can be configured to perform phase estimation processing on the digital signals Ed, and can be configured to perform decision output processing on the digital signals Ed, and the functions thereof are not specifically limited in this embodiment.

In an embodiment, an optical transmission signal Ot and a local oscillator signal Olo (the frequency value of the local oscillator signal Olo differs from the frequency value of the optical transmission signal Ot by a preset offset frequency value, the preset offset frequency value being half of the symbol rate value of the optical transmission signal Ot) are separately transmitted to the optical coupling module 810; the optical coupling module 810 couples the optical transmission signal Ot and the local oscillator signal Olo to obtain a coupled signal Om, and transmits the coupled signal Om to the optoelectronic detection module 820; the optoelectronic detection module 820 performs optoelectronic conversion of the coupled signal Om to obtain an analog signal Es, and transmits the analog signal Es to the analog-to-digital conversion module 830; the analog-to-digital conversion module 830 samples the analog signal Es at a preset sampling frequency value (the preset sampling frequency value being twice the symbol rate value of the optical transmission signal Ot) to obtain a plurality of digital signals Ed; and the digital processing module 840 is capable of demodulating two digital signals Ed of which the phase difference is 90 degrees in the same symbol among the plurality of digital signals Ed. By replacing the phase diversity approach with a time division approach in this coherent detection device, the coherent detection device has the advantages of low equipment complexity, low equipment cost and low computational complexity.

It is to be noted that the optoelectronic detection module 820 may be provided with different numbers of optoelectronic detectors according to the actual application scenario. For example, if there is one optical transmission signal Ot that needs to be demodulated, the optoelectronic detection module 820 may be provided with one optoelectronic detector. For another example, if there are two optical transmission signals Ot that need to be demodulated at the same time, the optoelectronic detection module 820 may be provided with two optoelectronic detectors, and this embodiment does not limit the number of optoelectronic detectors provided in the optoelectronic detection module 820.

It is to be noted that the optoelectronic detector may be a balanced optoelectronic detector, and no uniqueness limitation is imposed thereon in this embodiment.

It is to be noted that the optical coupling module 810 may be an optical coupler, and no uniqueness limitation is imposed thereon in this embodiment.

It is to be noted that the local oscillator signal Olo received by the optical coupling module 810 may be generated in the coherent detection device, or may be transmitted to the coherent detection device through the optical signal transmitting device, and the source of the local oscillator signal Olo is not specifically limited in this embodiment.

Figure 9:
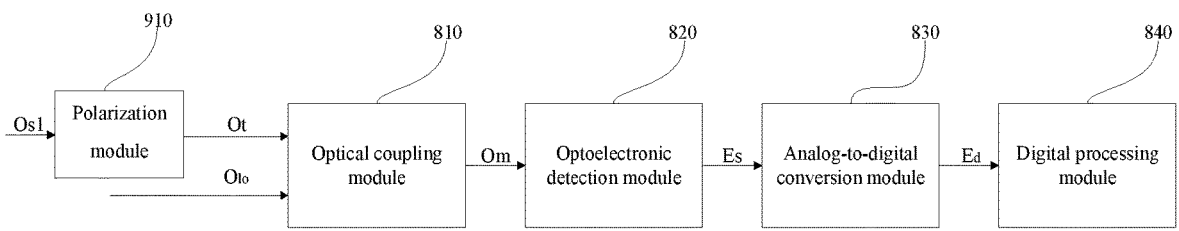
FIG. 9 is a schematic diagram of a coherent detection device provided by another embodiment of the present disclosure.

Referring to FIG. 9, in an embodiment, based on the embodiment as described above in FIG. 8, the coherent detection device further includes a polarization module 910 connected to the optical coupling module 810, the polarization module 910 being configured to receive a first optical source signal Os1, adjust the polarization state of the first optical source signal Os1 to obtain the optical transmission signal Ot, and transmit the optical transmission signal Ot to the optical coupling module 810.

In an embodiment, the coherent detection device may be provided with a polarization module 910, and through the polarization module 910, the polarization state of the received first optical source signal Os1 can be adjusted so that the polarization state of the first optical source signal Os1 is the same as that of the local oscillator signal Olo, and the first optical source signal Os1 may be coupled with the local oscillator signal Olo by the optical coupling module 810 to obtain the coupled signal Om. Since the frequency value of the local oscillator signal Olo differs from the frequency value of the optical transmission signal Ot by the preset offset frequency value and the preset offset frequency value is smaller than the symbol rate value of the optical transmission signal Ot, when the analog signal Es converted from the coupled signal Om is sampled according to the preset sampling frequency value that is greater than twice the symbol rate value of the optical transmission signal Ot, a plurality of digital signals Ed in the same symbol can be obtained, and when the phase difference between the two digital signals Ed in the same symbol does not meet the condition of 90 degrees, the digital processing module 840 can adjust the phase difference between the two digital signals Ed converted from the two analog signals Es in the same symbol to 90 degrees, and complete the demodulation. By replacing the phase diversity approach with a time division approach in this coherent detection device, the coherent detection device has the advantages of low equipment complexity, low equipment cost and low computational complexity.

It is to be noted that the polarization module 910 may be a polarization controller or a polarization beam splitting unit, which is not specifically limited in this embodiment. For example: when the polarization module 910 is a polarization controller, the polarization state of the optical transmission signal Ot can be adjusted by the polarization controller so that the polarization state of the optical transmission signal Ot is equal to the polarization state of the local oscillator signal. For another example, when the polarization module 910 is a polarization beam splitting unit, the polarization beam splitting unit may divide the polarization state of the received optical transmission signal Ot into two optical signals of mutually perpendicular components, and the coherent detection device may perform coherent detection separately on the first optical signal and the second optical signal.

It is to be noted that the polarization beam splitting unit may be a polarization beam splitter, and no uniqueness limitation is imposed thereon in this embodiment.

Figure 10:
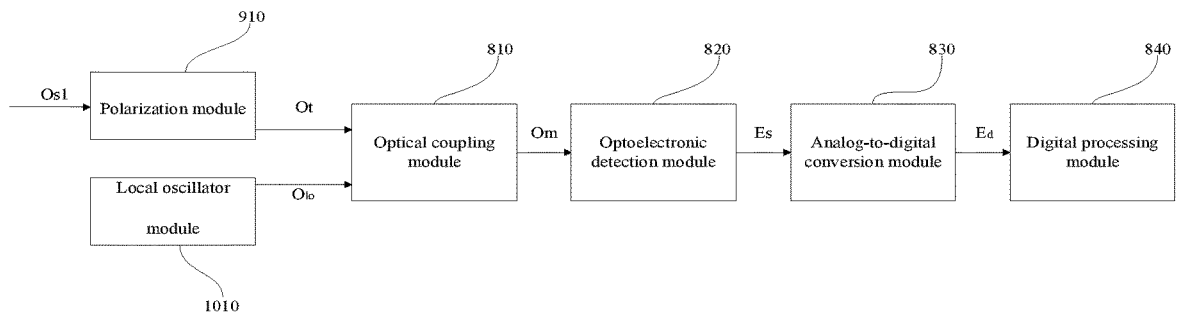
FIG. 10 is a schematic diagram of a coherent detection device provided by another embodiment of the present disclosure.

Referring to FIG. 10, in an embodiment, based on the embodiment as described above in FIG. 9, the coherent detection device further includes a local oscillator module 1010, the local oscillator module 1010 being configured to output the local oscillator signal Olo.

In an embodiment, a local oscillator module 1010 may be provided in the coherent detection device, where the local oscillator module 1010 may be configured to output the local oscillator signal Olo, and the frequency value of the output local oscillator signal Olo differs from the frequency value of the optical transmission signal Ot by a preset offset frequency value, the preset offset frequency value being smaller than the symbol rate value of the optical transmission signal Ot.

It is to be noted that the local oscillator module 1010 may be a distributed feed back (DFB) laser, and no uniqueness limitation is imposed thereon in this embodiment.

Figure 11:
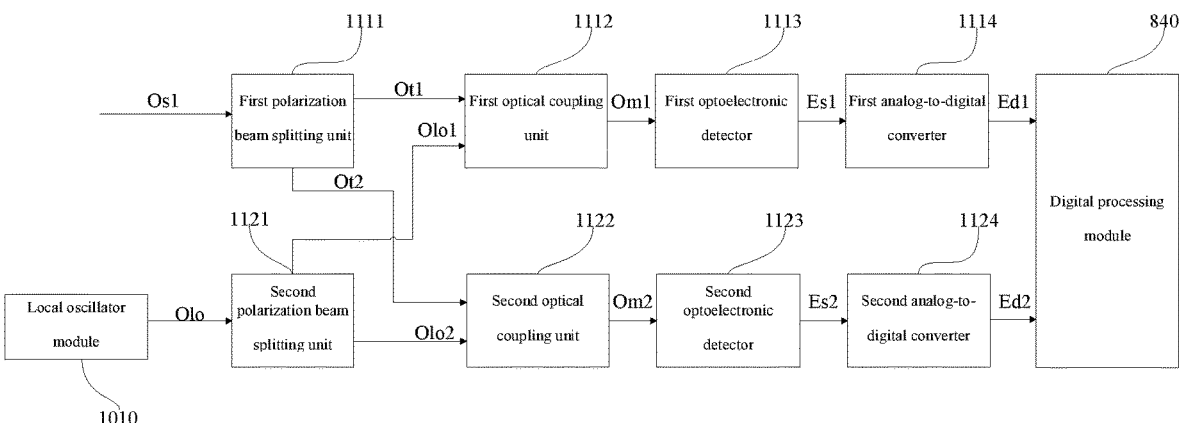
FIG. 11 is a schematic diagram of a coherent detection device provided by another embodiment of the present disclosure.

Referring to FIG. 11, in an embodiment, based on the embodiment as described above in FIG. 10, the optical coupling module 810 of the coherent detection device includes a first optical coupling unit 1112 and a second optical coupling unit 1122, the polarization module 910 includes a first polarization beam splitting unit 1111 and a second polarization beam splitting unit 1121, the optoelectronic detection module 820 includes a first optoelectronic detector 1113 and a second optoelectronic detector 1123, and the analog-to-digital conversion module 830 includes a first analog-to-digital converter 1114 and a second analog-to-digital converter 1124, where the first optical coupling unit 1112, the first optoelectronic detector 1113, the first analog-to-digital converter 1114, and the digital processing module 840 are connected in sequence, the second optical coupling unit 1122, the second optoelectronic detector 1123, the second analog-to-digital converter 1124 and the digital processing module 840 are connected in sequence, the first polarization beam splitting unit 1111 is connected separately to the first optical coupling unit 1112 and the second optical coupling unit 1122, and the second polarization beam splitting unit 1121 is connected separately to the local oscillation module, the first optical coupling unit 1112, and the second optical coupling unit 1122; the optical transmission signal Ot includes a first optical signal Ot1 and a second optical signal Ot2, where the polarization state of the first optical signal Ot1 is orthogonal to the polarization state of the second optical signal Ot2; the first polarization beam splitting unit 1111 is configured to divide the first optical source signal Os1 into the first optical signal Ot1 and the second optical signal Ot2, and transmit the first optical signal Ot1 to the first optical coupling unit 1112 and the second optical signal Ot2 to the second optical coupling unit 1122; and the second polarization beam splitting unit 1121 is configured to receive the local oscillator signal Olo, divide the local oscillator signal Olo into a first local oscillator signal Olo1 and a second local oscillator signal Olo2, and transmit the first local oscillator signal Olo1 to the first optical coupling unit 1112 and the second local oscillator signal Olo2 to the second optical coupling unit 1122, where the polarization state of the first local oscillator signal Olo1 is orthogonal to the polarization state of the second local oscillator signal Olo2. That is, the first optical source signal Os1 received by the coherent detection device is demodulated in a polarization diversity manner. By replacing the phase diversity approach with a time division approach in this coherent detection device, the coherent detection device has the advantages of low equipment complexity, low equipment cost and low computational complexity.

In an embodiment, the optical transmission signal Ot is divided into a first optical signal Ot1 and a second optical signal Ot2 by the first polarization beam splitting unit 1111, and the local oscillator signal Olo (the frequency value of the local oscillator signal Olo differs from the frequency value of the optical transmission signal Ot by a preset offset frequency value, the preset offset frequency value being smaller than a symbol rate value of the optical transmission signal Ot) is divided into a first local oscillator signal Olo1 and a second local oscillator signal Olo2 by the second polarization beam splitting unit 1121, and in this manner, by setting the first polarization beam splitting unit 1111 and the second polarization beam splitting unit 1121, the polarization state of the optical transmission signal Ot and the polarization state of the local oscillator signal Olo can be uniformly adjusted, respectively, so that the polarization state of the first optical signal Ot1 is the same as the polarization state of the first local oscillator signal Olo1 and the polarization state of the second optical signal Ot2 is the same as the polarization state of the second local oscillator signal Olo2; the first optical signal Ot1 and the first local oscillator signal Olo1 can be coupled through the first optical coupling unit 1112 to obtain a first coupled signal Om1, and the first coupled signal Om1 is transmitted to the first optoelectronic detector 1113; the first optoelectronic detector 1113 performs optoelectronic conversion of the first coupled signal Om1 to obtain a first analog signal Es1, and transmits the first analog signal Es1 to the first analog-to-digital converter 1114; the first analog-to-digital converter 1114 samples the first analog signal Es1 at a preset sampling frequency value (the preset sampling frequency value is greater than or equal to twice the symbol rate value of the optical transmission signal Ot), and first analog signals Es1 at two different time points in the same symbol can be obtained, which means that the first analog signals Es1 can be digitally converted by the first analog-to-digital converter 1114, and first digital signals Ed1 at the two different time points in the same symbol can be obtained; and then the digital processing module 840 processes the first digital signals Ed1 at the two different time points in the same symbol so as to cause the two first digital signals Ed1 to differ in phase by 90 degrees, and completes the demodulation. By replacing the phase diversity approach with a time division approach in this coherent detection device, the coherent detection device has the advantages of low equipment complexity, low equipment cost and low computational complexity. Similarly, the second optical signal Ot2 and the second local oscillator signal Olo2 can be coupled through the second optical coupling unit 1122 to obtain a second coupled signal Om2, and the second coupled signal Om2 is transmitted to the second optoelectronic detector 1123; the second optoelectronic detector 1123 performs optoelectronic conversion of the second coupled signal Om2 to obtain a second analog signal Es2, and transmits the second analog signal Es2 to the second analog-to-digital converter 1124; the second analog-to-digital converter 1124 samples the second analog signal Es2 at a preset sampling frequency value (the preset sampling frequency value is greater than or equal to twice the symbol rate value of the optical transmission signal Ot), and second digital signals Ed2 at two different time points in the same symbol can be obtained; and then the digital processing module 840 processes the second digital signals Ed2 at the two different time points in the same symbol so as to cause the two second digital signals Ed2 to differ in phase by 90 degrees, and completes the demodulation. By replacing the phase diversity approach with a time division approach in this coherent detection device, the coherent detection device has the advantages of low equipment complexity, low equipment cost and low computational complexity.

It is to be noted that the digital processing modules 840 for processing the first digital signal Ed1 and the second digital signal Ed2 may be the same digital processor, or may be two separate digital processors, which is not specifically limited in this embodiment.

Figure 12:
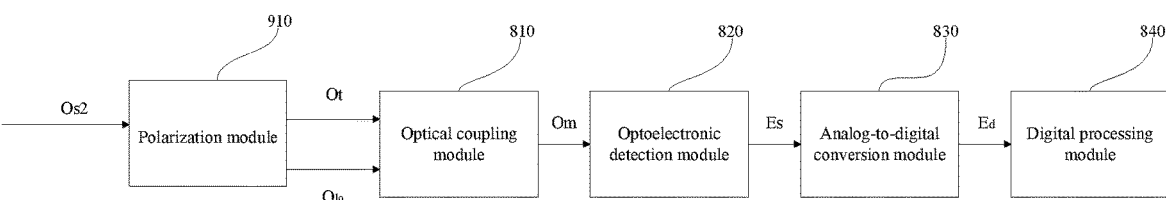
FIG. 12 is a schematic diagram of a coherent detection device provided by another embodiment of the present disclosure.

Referring to FIG. 12, in an embodiment, a second optical source signal Os2 is a combined optical signal obtained through optical combination of the optical transmission signal Ot and the local oscillator signal Olo, and the polarization module 910 is configured to divide the second optical source signal Os2 into the optical transmission signal Ot and the local oscillator signal Olo, and transmit the optical transmission signal Ot and the local oscillator signal Olo separately to the optical coupling module 810.

In an embodiment, if the second optical source signal Os2 transmitted by the optical signal transmitting device to the coherent detection device is a combined optical signal obtained by combining the optical transmission signal Ot and the local oscillator signal Olo (the frequency value of the local oscillator signal Olo differs from the frequency value of the optical transmission signal Ot by a preset offset frequency value, the preset offset frequency value being smaller than the symbol rate value of the optical transmission signal Ot), then the polarization module 910 of the coherent detection device may be a polarization beam splitting unit; the combined optical signal can be divided into an optical transmission signal Ot and a local oscillator signal Olo after passing through the polarization beam splitting unit, and then the optical transmission signal Ot and the local oscillator signal Olo are separately transmitted to the optical coupling module 810 for coupling to obtain a coupled signal Om, and the coupled signal Om is transmitted to the optoelectronic detection module 820; the optoelectronic detection module 820 performs optoelectronic conversion of the coupled signal Om to obtain an analog signal Es, and transmits the analog signal Es to the analog-to-digital conversion module 830; the analog-to-digital conversion module 830 samples the analog signal Es at a preset sampling frequency value (the preset sampling frequency value is greater than or equal to twice the symbol rate value of the optical transmission signal Ot) and converts the analog signal Es into a plurality of digital signals Ed, and the analog-to-digital conversion module 830 transmits the plurality of digital signals Ed to the digital processing module 840; and the digital processing module 840 can process two digital signals Ed in the same symbol among the plurality of digital signals Ed so that the phase difference between the two digital signals Ed is 90 degrees, thereby enabling the demodulation work to be completed. By replacing the phase diversity approach with a time division approach in this coherent detection device, the coherent detection device has the advantages of low equipment complexity, low equipment cost and low computational complexity.

Figure 13:
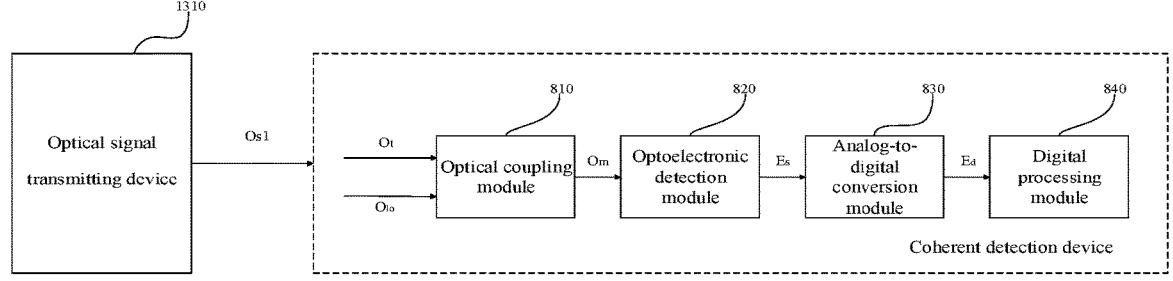
FIG. 13 is a schematic diagram of an optical transmission system provided by an embodiment of the present disclosure.

As shown in FIG. 13, which FIG. 13 is a schematic diagram of an optical transmission system in an embodiment, the optical transmission system includes an optical signal transmitting device 1310 and a coherent detection device of the above embodiment, where the optical signal transmitting device 1310 is connected to the coherent detection device via an optical fiber, and the coherent detection device may be configured to demodulate a modulated first optical source signal Os1 transmitted by the optical signal transmitting device 1310; and the coherent detection device may include an optical coupling module 810, an optoelectronic detection module 820, an analog-to-digital conversion module 830, and a digital processing module 840 connected in sequence, where the optical coupling module 810 is configured to receive an optical transmission signal Ot and a local oscillator signal Olo, and to obtain a coupled signal Om according to the optical transmission signal Ot and the local oscillator signal Olo, where the frequency value of the local oscillator signal Olo differs from the frequency value of the optical transmission signal Ot by a preset offset frequency value, the preset offset frequency value being smaller than a symbol rate value of the optical transmission signal Ot; the optoelectronic detection module 820 is configured to convert the coupled signal Om into an analog signal Es; the analog-to-digital conversion module 830 is configured to sample the analog signal Es in accordance with a preset sampling frequency value to obtain a plurality of digital signals Ed, the preset sampling frequency value being greater than or equal to twice the symbol rate value of the optical transmission signal Ot; and the digital processing module 840 is configured to adjust the phase difference between two digital signals Ed in the same symbol among the plurality of digital signals Ed to 90 degrees. Since the frequency value of the local oscillator signal Olo differs from the frequency value of the optical transmission signal Ot by the preset offset frequency value and the preset offset frequency value is smaller than the symbol rate value of the optical transmission signal Ot, when the analog signal Es converted from the coupled signal Om is sampled according to the preset sampling frequency value that is greater than or equal to twice the symbol rate value of the optical transmission signal Ot, two digital signals Ed of which the phase difference is close to or equal to 90 degrees in the same symbol can be obtained, and when the phase difference between the two digital signals Ed in the same symbol does not meet the condition of 90 degrees, the digital processing module 840 can adjust the phase difference between the two digital signals Ed converted from the two analog signals Es in the same symbol to 90 degrees, and complete the demodulation; and if the phase difference between the two digital signals Ed in the same symbol is 90 degrees, the digital processing module 840 can directly demodulate the two digital signals Ed. By replacing the phase diversity approach with a time division approach in this optical transmission system, the optical transmission system has the advantages of low equipment complexity, low equipment cost and low computational complexity.

In an embodiment, based on the optical transmission system of FIG. 13, when the preset offset frequency value is half the symbol rate value of the optical transmission signal Ot and the preset sampling frequency value is twice the symbol rate value of the optical transmission signal Ot, the optical transmission signal Ot and the local oscillator signal Olo may be separately transmitted to the optical coupling module 810; the optical coupling module 810 couples the optical transmission signal Ot and the local oscillator signal Olo to obtain a coupled signal Om, and transmits the coupled signal Om to the optoelectronic detection module 820; the optoelectronic detection module 820 performs optoelectronic conversion of the coupled signal Om to obtain an analog signal Es, and transmits the analog signal Es to the analog-to-digital conversion module 830; the analog-to-digital conversion module 830 samples the analog signal Es at the preset sampling frequency value and obtains a plurality of digital signals Ed, thus enabling a 90-degree phase difference to exist between two sampled digital signals Ed in the same symbol, which means that the two sampled digital signals Ed are the in-phase component and the quadrature component in the same symbol, and the analog-to-digital conversion module 830 transmits the two digital signals Ed to the digital processing module 840; and the digital processing module 840 processes the digital signal Ed converted from the sampled analog signal Es to complete demodulation of the optical transmission signal Ot. By replacing the phase diversity approach with a time division approach in this optical transmission system, the optical transmission system has the advantages of low equipment complexity, low equipment cost and low computational complexity.

It is to be noted that the optoelectronic detection module 820 may be provided with different numbers of optoelectronic detectors according to the actual application scenario. For example, if there is one optical transmission signal Ot that needs to be demodulated, the optoelectronic detection module 820 may be provided with one optoelectronic detector. For another example, if there are two optical transmission signals Ot that need to be demodulated at the same time, the optoelectronic detection module 820 may be provided with two optoelectronic detectors, and this embodiment does not limit the number of optoelectronic detectors provided in the optoelectronic detection module 820.

It is to be noted that the optoelectronic detector may be a balanced optoelectronic detector, and no uniqueness limitation is imposed thereon in this embodiment.

It is to be noted that the optical coupling module 810 may be an optical coupler, and no uniqueness limitation is imposed thereon in this embodiment.

It is to be noted that the local oscillator signal Olo received by the optical coupling module 810 may be generated in the coherent detection device, or may be transmitted to the coherent detection device through the optical signal transmitting device, and the source of the local oscillator signal Olo is not specifically limited in this embodiment.

It is to be noted that the optical fiber connection between the optical signal transmitting device 1310 and the coherent detection device may be a standard single mode fiber (SSMF) connection, or may be a back-to-back connection, which is not specifically limited in this embodiment.

It is to be noted that the link for optical fiber transmission may be provided with an adjustable optical attenuation module configured to adjust the amplitude of the first optical source signal Os1, and the power of the first optical source signal Os1 transmitted on the optical fiber may be tuned down by the adjustable optical attenuation module, so that it is possible to prevent the first optical source signal Os1 received by the coherent detection device from being too high in power, which leads to influence on the normal operation of the coherent detection device.

Figure 14:
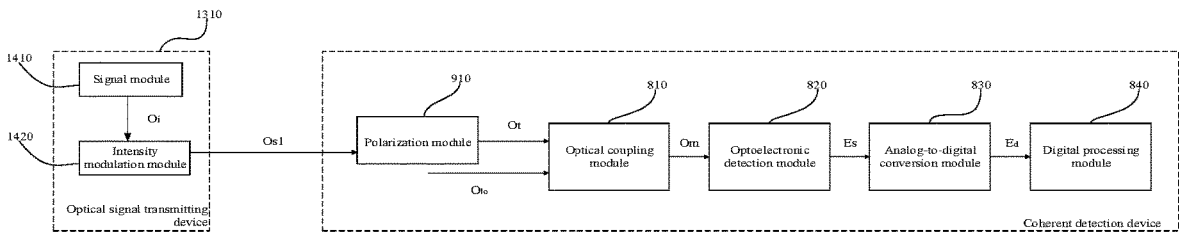
FIG. 14 is a schematic diagram of an optical transmission system provided by another embodiment of the present disclosure.

Referring to FIG. 14, in an embodiment, based on the embodiment of the optical transmission system of FIG. 13, the optical signal transmitting device 1310 may include a signal module 1410 configured to output an initial optical signal Oi and an intensity modulation module 1420 connected to the signal module 1410, the intensity adjustment module being configured to perform intensity modulation on the initial optical signal Oi to obtain a first optical source signal Os1. The intensity modulation module 1420 performs intensity modulation on the initial optical signal Oi to obtain the first optical source signal Os1, and the modulated first optical source signal Os1 has a strong anti-interference capability, thereby making it possible to reduce the noise influence on the first optical source signal Os1 when it is transmitted through the optical fiber to the coherent detection device.

It is to be noted that the intensity modulation module 1420 may be an Electroabsorption Modulated distributed feedback Laser (EML) or may include a DFB laser and a Mach-Zehnder Modulator (MZM), which is not specifically limited in this embodiment.

It is to be noted that the initial optical signal Oi may be a PAM2 pulse signal or a PAM4 pulse signal, and the initial optical signal Oi is not specifically limited in this embodiment.

Figure 15:
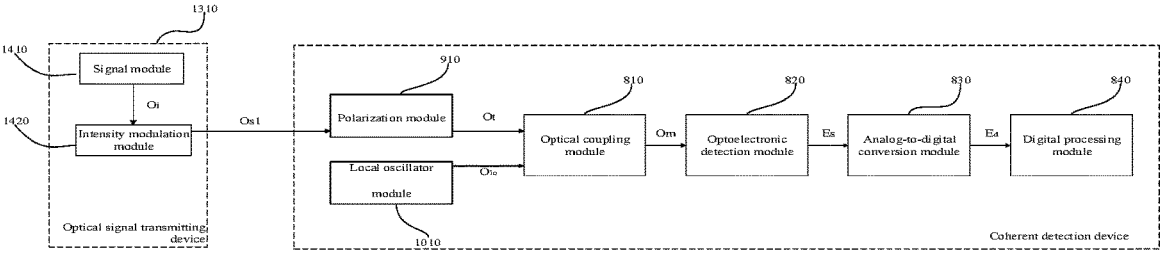
FIG. 15 is a schematic diagram of an optical transmission system provided by another embodiment of the present disclosure.

Referring to FIG. 15, in an embodiment, based on the embodiment of the optical transmission system of FIG. 14, the coherent detection device further includes a local oscillator module 1010, the local oscillator module 1010 being configured to output the local oscillator signal Olo.

In an embodiment, a local oscillator module 1010 may be provided in the coherent detection device, where the local oscillator module 1010 may be configured to output the local oscillator signal Olo, and the frequency value of the output local oscillator signal Olo differs from the frequency value of the optical transmission signal Ot by a preset offset frequency value, the preset offset frequency value being half of the symbol rate value of the optical transmission signal Ot.

It is to be noted that the local oscillator module 1010 may be a distributed feed back (DFB) laser, and no uniqueness limitation is imposed thereon in this embodiment.

It is to be noted that the output local oscillator signal Olo output by the local oscillator module 1010 can be directly transmitted to the optical coupling module 810, or can be transmitted to the optical coupling module 810 after being subjected to polarization processing by the polarization module 910, and the connection relationship of the local oscillator module 1010 can be set according to the actual situation, which is not specifically limited in this embodiment.

Figure 16:
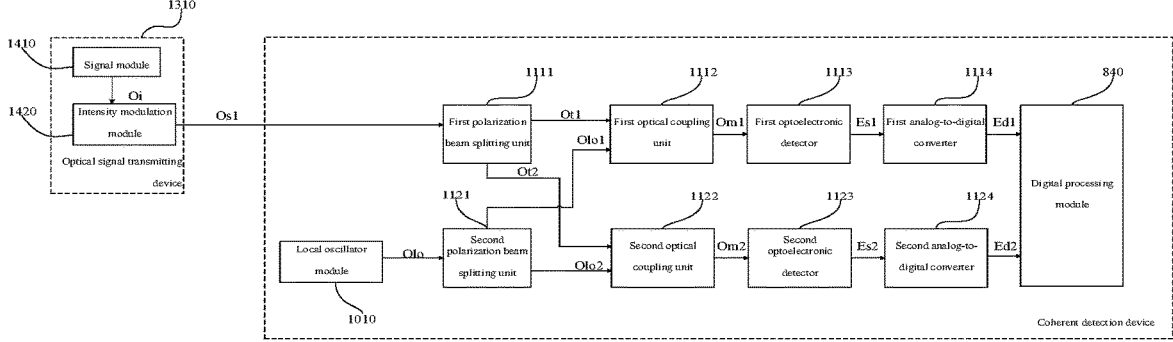
FIG. 16 is a schematic diagram of an optical transmission system provided by another embodiment of the present disclosure.

Referring to FIG. 16, in an embodiment, the optical coupling module of the coherent detection device includes a first optical coupling unit 1112 and a second optical coupling unit 1122, the polarization module includes a first polarization beam splitting unit 1111 and a second polarization beam splitting unit 1121, the optoelectronic detection module 820 includes a first optoelectronic detector 1113 and a second optoelectronic detector 1123, and the analog-to-digital conversion module 830 includes a first analog-to-digital converter 1114 and a second analog-to-digital converter 1124, where the first optical coupling unit 1112, the first optoelectronic detector 1113, the first analog-to-digital converter 1114, and the digital processing module 840 are connected in sequence, the second optical coupling unit 1122, the second optoelectronic detector 1123, the second analog-to-digital converter 1124 and the digital processing module 840 are connected in sequence, the first polarization beam splitting unit 1111 is connected separately to the first optical coupling unit 1112 and the second optical coupling unit 1122, and the second polarization beam splitting unit 1121 is connected separately to the local oscillation module 1010, the first optical coupling unit 1112, and the second optical coupling unit 1122; the optical transmission signal Ot includes a first optical signal Ot1 and a second optical signal Ot2, where the polarization state of the first optical signal Ot1 is orthogonal to the polarization state of the second optical signal Ot2; the first polarization beam splitting unit 1111 is configured to divide the first optical source signal Os1 into the first optical signal Ot1 and the second optical signal Ot2, and transmit the first optical signal Ot1 to the first optical coupling unit 1112 and the second optical signal Ot2 to the second optical coupling unit 1122; and the second polarization beam splitting unit 1121 is configured to receive the local oscillator signal Olo, divide the local oscillator signal Olo into a first local oscillator signal Olo1 and a second local oscillator signal Olo2, and transmit the first local oscillator signal Olo1 to the first optical coupling unit 1112 and the second local oscillator signal Olo2 to the second optical coupling unit 1122, where the polarization state of the first local oscillator signal Olo1 is orthogonal to the polarization state of the second local oscillator signal Olo2. That is, the first optical source signal Os1 received by the coherent detection device is demodulated in a polarization diversity manner. By replacing the phase diversity approach with a time division approach in this optical transmission system, the optical transmission system has the advantages of low equipment complexity, low equipment cost and low computational complexity.

In an embodiment, the optical transmission signal Ot is divided into a first optical signal Ot1 and a second optical signal Ot2 by the first polarization beam splitting unit 1111, and the local oscillator signal Olo (the frequency value of the local oscillator signal Olo differs from the frequency value of the optical transmission signal Ot by a preset offset frequency value, the preset offset frequency value being smaller than a symbol rate value of the optical transmission signal Ot) is divided into a first local oscillator signal Olo1 and a second local oscillator signal Olo2 by the second polarization beam splitting unit 1121, and in this manner, by setting the first polarization beam splitting unit 1111 and the second polarization beam splitting unit 1121, the polarization state of the optical transmission signal Ot and the polarization state of the local oscillator signal Olo can be uniformly adjusted, respectively, so that the polarization state of the first optical signal Ot1 is the same as the polarization state of the first local oscillator signal Olo1 and the polarization state of the second optical signal Ot2 is the same as the polarization state of the second local oscillator signal Olo2; the first optical signal Ot1 and the first local oscillator signal Olo1 can be coupled through the first optical coupling unit 1112 to obtain a first coupled signal Om1, and the first coupled signal Om1 is transmitted to the first optoelectronic detector 1113; the first optoelectronic detector 1113 performs optoelectronic conversion of the first coupled signal Om1 to obtain a first analog signal Es1, and transmits the first analog signal Es1 to the first analog-to-digital converter 1114; the first analog-to-digital converter 1114 samples the first analog signal Es1 at a preset sampling frequency value (the preset sampling frequency value is greater than or equal to twice the symbol rate value of the optical transmission signal Ot) to obtain a plurality of first digital signals Ed1; and the digital processing module 840 can process first digital signals Ed1 at two different time points in the same symbol among the plurality of first digital signals Ed1 so as to cause the two first digital signals Ed1 to differ in phase by 90 degrees, and then complete the demodulation. By replacing the phase diversity approach with a time division approach in this optical transmission system, the optical transmission system has the advantages of low equipment complexity, low equipment cost and low computational complexity. Similarly, the second optical signal Ot2 and the second local oscillator signal Olo2 can be coupled through the second optical coupling unit 1122 to obtain a second coupled signal Om2, and the second coupled signal Om2 is transmitted to the second optoelectronic detector 1123; the second optoelectronic detector 1123 performs optoelectronic conversion of the second coupled signal Om2 to obtain a second analog signal Es2, and transmits the second analog signal Es2 to the second analog-to-digital converter 1124; the second analog-to-digital converter 1124 samples the second analog signal Es2 at a preset sampling frequency value (the preset sampling frequency value is greater than or equal to twice the symbol rate value of the optical transmission signal Ot) to obtain a plurality of second digital signals Ed2; and the digital processing module 840 can process second digital signals Ed2 at two different time points in the same symbol among the plurality of second digital signals Ed2 so as to cause the two second digital signals Ed2 to differ in phase by 90 degrees, and then complete the demodulation. By replacing the phase diversity approach with a time division approach in this optical transmission system, the optical transmission system has the advantages of low equipment complexity, low equipment cost and low computational complexity.

It is to be noted that the first polarization beam splitting unit 1111 and the second polarization beam splitting unit 1121 may be polarization beam splitters, and no uniqueness limitation is imposed thereon in this embodiment.

Figure 17:
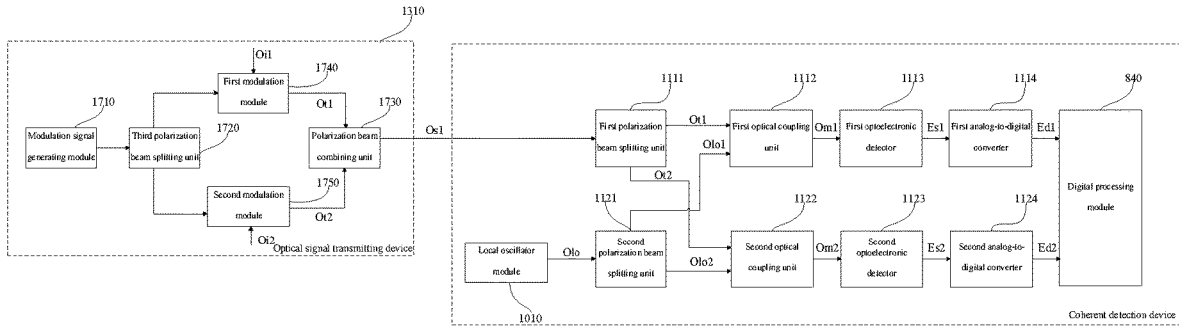
FIG. 17 is a schematic diagram of an optical transmission system provided by another embodiment of the present disclosure.

Referring to FIG. 17, in an embodiment, based on the embodiment of the optical transmission system of FIG. 16, the optical signal transmitting device 1310 further includes a modulation signal generating module 1710, a third polarization beam splitting unit 1720, and a polarization beam combining unit 1730; the intensity modulation module 1420 includes a first modulation module 1740 and a second modulation module 1750, and the signal module 1410 is separately connected to the first modulation module 1740 and the second modulation module 1750; the modulation signal generating module 1710 is connected to the third polarization beam splitting unit 1720, and the first modulation module 1740 and the second modulation module 1750 are connected in parallel between the third polarization beam splitting unit 1720 and the polarization beam combining unit 1730; the first modulation module 1740 is configured to generate a first optical signal Ot1; the second modulation module 1750 is configured to generate a second optical signal Ot2; and the polarization beam combining unit 1730 is configured to combine the first optical signal Ot1 and the second optical signal Ot2 into a first optical source signal Os1.

In an embodiment, a carrier signal generated by the modulation signal generating module 1710 is divided into a first carrier signal and a second carrier signal by the third polarization beam splitting unit 1720, where the first carrier signal is combined with the first initial optical signal Oi by the first modulation module 1740 to obtain the first optical signal Ot1, and the second carrier signal is combined with the second initial optical signal Oi by the second modulation module 1750 to obtain the second optical signal Ot2, and the first optical signal Ot1 and the second optical signal Ot2 are combined into the first optical source signal Os1 by the polarization beam combining unit 1730, and then the optical signal transmitting device 1310 can transmit the first optical source signal Os1 to the coherent detection device, and the working principle of the subsequent processing process of the coherent detection device is consistent with that of the embodiment in FIG. 11, and will not be repeated herein. By replacing the phase diversity approach with a time division approach in this optical transmission system, the optical transmission system has the advantages of low equipment complexity, low equipment cost and low computational complexity.

It is to be noted that the first modulation module 1740 and the second modulation module 1750 may be MZMs, and no uniqueness limitation is imposed thereon in this embodiment.

It is to be noted that the polarization beam combining unit 1730 may be a polarization beam combiner, and no uniqueness limitation is imposed thereon in this embodiment.

Figure 18:
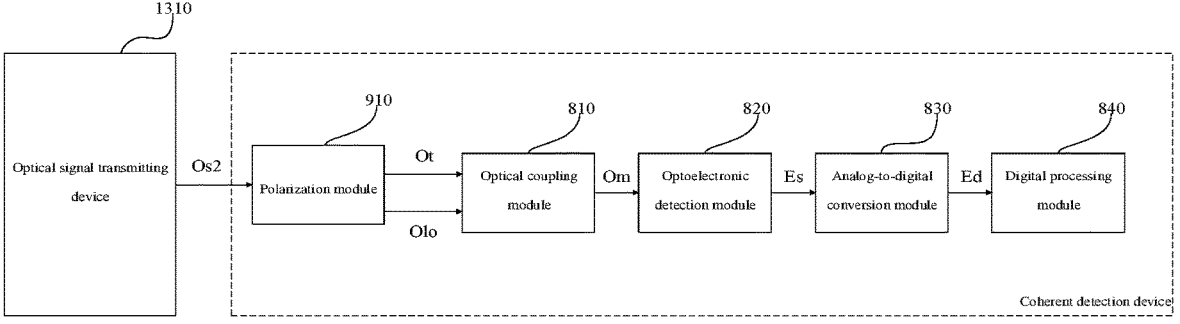
FIG. 18 is a schematic diagram of an optical transmission system provided by another embodiment of the present disclosure.

Referring to FIG. 18, in an embodiment, based on the embodiment of the optical transmission system of FIG. 12, an optical signal transmitting device 1310 is further included, where the optical signal transmitting device 1310 is connected to the coherent detection device via an optical fiber, and the optical signal transmitting device 1310 is configured to transmit the second optical source signal Os2 to the coherent detection device via the optical fiber, the second optical source signal Os2 being a combined optical signal obtained through optical combination of the optical transmission signal Ot and the local oscillator signal Olo, and the polarization module 910 in the coherent detection device is configured to divide the second optical source signal Os2 into the optical transmission signal Ot and the local oscillator signal Olo, and to separately transmit the optical transmission signal Ot and the local oscillator signal Olo to the optical coupling module 810, where the polarization module 910 may be a polarization beam splitting unit.

In an embodiment, if the second optical source signal Os2 transmitted by the optical signal transmitting device 1310 to the coherent detection device is a combined optical signal obtained by combining the optical transmission signal Ot and the local oscillator signal Olo (the frequency value of the local oscillator signal Olo differs from the frequency value of the optical transmission signal Ot by a preset offset frequency value, the preset offset frequency value being smaller than the symbol rate value of the optical transmission signal Ot), then the polarization module 910 of the coherent detection device may be a polarization beam splitting unit; the second optical source signal Os2 can be divided into an optical transmission signal Ot and a local oscillator signal Olo after passing through the polarization beam splitting unit, and then the optical transmission signal Ot and the local oscillator signal Olo are separately transmitted to the optical coupling module 810 for coupling to obtain a coupled signal Om, and the coupled signal Om is transmitted to the optoelectronic detection module 820; the optoelectronic detection module 820 performs optoelectronic conversion of the coupled signal Om to obtain an analog signal Es, and transmits the analog signal Es to the analog-to-digital conversion module 830; the analog-to-digital conversion module 830 samples the analog signal Es at a preset sampling frequency value (the preset sampling frequency value is greater than or equal to twice the symbol rate value of the optical transmission signal Ot) and obtains a plurality of digital signals Ed, and can obtain two digital signals Ed of which the phase difference is close to or equal to 90 degrees in the same symbol, and when the phase difference between the two digital signals Ed in the same symbol does not meet the condition of 90 degrees, the digital processing module 840 can adjust the phase difference of the two digital signals Ed in the same symbol to 90 degrees, and complete the demodulation; and if the phase difference between the two digital signals Ed in the same symbol is 90 degrees, the digital processing module 840 can directly demodulate the two digital signals Ed. By replacing the phase diversity approach with a time division approach in this optical transmission system, the optical transmission system has the advantages of low equipment complexity, low equipment cost and low computational complexity.

Figure 19:
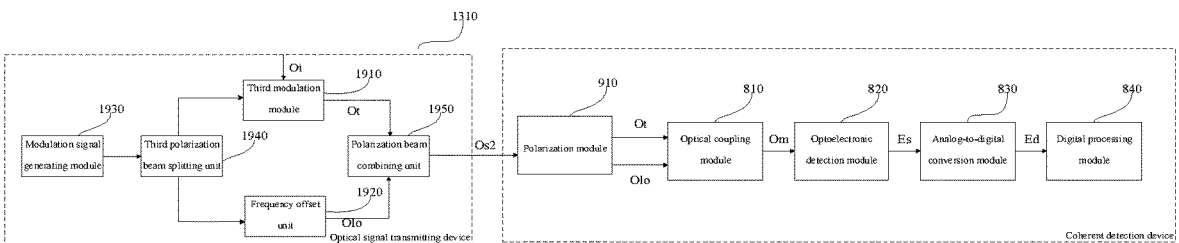
FIG. 19 is a schematic diagram of an optical transmission system provided by another embodiment of the present disclosure.

Referring to FIG. 19, in an embodiment, based on the embodiment of the optical transmission system of FIG. 18, the optical signal transmitting device 1310 further includes a modulation signal generating module 1930, a third polarization beam splitting unit 1940, and a polarization beam combining unit 1950; the intensity modulation module includes a third modulation module 1910 and a frequency offset unit 1920, and the signal module is connected to the third modulation module 1910; the modulation signal generating module 1930 is connected to the third polarization beam splitting unit 1940, and the third modulation module 1910 and the frequency offset unit 1920 are connected in parallel between the third polarization beam splitting unit 1940 and the polarization beam combining unit 1950; the third modulation module 1910 is configured to generate the optical transmission signal Ot; the frequency offset unit 1920 is configured to perform frequency adjustment on a modulated signal from the modulation signal generating module 1930 to obtain a local oscillator signal Olo; and the polarization beam combining unit 1950 is configured to combine the optical transmission signal Ot and the local oscillator signal Olo into a second optical source signal Os2.

In an embodiment, the generation of the local oscillator signal Olo may be performed in the optical signal transmitting device 1310, and the modulation signal generated by the modulation signal generating module is divided into two modulation signals by the third polarization beam splitting unit 1940, and the two modulation signals are transmitted to the third modulation module 1910 and to the frequency offset unit 1920, respectively, where one modulation signal is combined with the initial optical signal Oi by the third modulation module 1910 to obtain the optical transmission signal Ot, and the other modulation signal is subjected to frequency adjustment by the frequency offset unit 1920 to obtain the local oscillator signal Olo (the frequency value of the local oscillator signal Olo differs from the frequency value of the optical transmission signal Ot by a preset offset frequency value, the preset offset frequency value being smaller than the symbol rate value of the optical transmission signal Ot); the third modulation module 1910 transmits the optical transmission signal Ot to the polarization beam combining unit 1950, and the frequency offset unit 1920 transmits the local oscillator signal Olo to the polarization beam combining unit 1950; the polarization beam combining unit 1950 combines the optical transmission signal Ot and the local oscillator signal Olo into a second optical source signal Os2, and the second optical source signal Os2 can be divided into an optical transmission signal Ot and a local oscillator signal Olo after passing through the polarization beam splitting unit, and then the optical transmission signal Ot and the local oscillator signal Olo are separately transmitted to the optical coupling module 810 for coupling to obtain a coupled signal Om, and the coupled signal Om is transmitted to the optoelectronic detection module 820; the optoelectronic detection module 820 performs optoelectronic conversion of the coupled signal Om to obtain an analog signal Es, and transmits the analog signal Es to the analog-to-digital conversion module 830; the analog-to-digital conversion module 830 samples the analog signal Es at a preset sampling frequency value (the preset sampling frequency value is greater than or equal to twice the symbol rate value of the optical transmission signal Ot) and converts the analog signal Es into digital signals Ed, and can obtain two digital signals Ed of which the phase difference is close to or equal to 90 degrees in the same symbol, and when the phase difference between the two digital signals Ed in the same symbol does not meet the condition of 90 degrees, the digital processing module 840 can adjust the phase difference of the two digital signals Ed in the same symbol to 90 degrees, and complete the demodulation; and if the phase difference between the two digital signals Ed in the same symbol is 90 degrees, the digital processing module 840 can directly demodulate the two digital signals Ed. By replacing the phase diversity approach with a time division approach in the optical transmission system, this coherent detection system has the advantages of low equipment complexity, low equipment cost and low computational complexity.

It is to be noted that the third polarization beam splitting unit 1940 may be a polarization beam splitter, and no uniqueness limitation is imposed thereon in this embodiment.

The above is a detailed description of the embodiments of the present disclosure, but the present disclosure is not limited to the above-mentioned embodiments. Those of ordinary skill in the art can also make various equivalent modifications or replacements without departing from the scope of the present disclosure, and these equivalent modifications or replacements are all included in the scope defined by the claims of the present disclosure.

The invention claimed is:

1. A coherent detection method applied to a coherent detection device, the method comprising:

acquiring an optical transmission signal and a local oscillator signal, wherein a frequency value of the local oscillator signal differs from a frequency value of the optical transmission signal by a preset offset frequency value, the preset offset frequency value being smaller than a symbol rate value of the optical transmission signal;

coupling the optical transmission signal and the local oscillator signal to obtain only one coupled signal, wherein the coupled signal has values on both an in-phase component and a quadrature component;

converting the coupled signal into an analog signal;

sampling the analog signal according to a preset sampling frequency value and converting the analog signal into a plurality of digital signals by one analog-to-digital conversion module, wherein the plurality of digital signals comprises the in-phase component and the quadrature component; and processing two digital signals among the plurality of digital signals so that a phase difference between the two digital signals is 90 degrees, wherein the two digital signals are derived from a same signal symbol in the optical transmission signal.

2. The coherent detection method according to claim 1, wherein before said acquiring an optical transmission signal and a local oscillator signal, the coherent detection method further comprises:

receiving a first optical source signal, the first optical source signal being an optical signal comprising a different polarization state; and adjusting the polarization state of the first optical source signal to obtain the optical transmission signal.

3. The coherent detection method according to claim 2, wherein before said acquiring an optical transmission signal and a local oscillator signal, the coherent detection method further comprises:

performing beam splitting processing on the first optical source signal to obtain the optical transmission signal comprising a first optical signal and a second optical signal, wherein the polarization state of the first optical signal is orthogonal to the polarization state of the second optical signal.

4. The coherent detection method according to claim 3, wherein after said acquiring an optical transmission signal and a local oscillator signal, the coherent detection method further comprises:

performing beam splitting processing on the local oscillator signal to obtain a first local oscillator signal and a second local oscillator signal, wherein the polarization state of the first local oscillator signal is orthogonal to the polarization state of the second local oscillator signal.

5. The coherent detection method according to claim 1, wherein before said acquiring an optical transmission signal and a local oscillator signal, the coherent detection method further comprises:

receiving a second optical source signal, which is a combined optical signal obtained through optical combination of the optical transmission signal and the local oscillator signal; and performing beam splitting processing on the second optical source signal to obtain the optical transmission signal and the local oscillator signal.

6. The coherent detection method according to claim 1, wherein the preset sampling frequency value is greater than twice the symbol rate value of the optical transmission signal; or the preset sampling frequency value is equal to twice the symbol rate value of the optical transmission signal.

7. The coherent detection method according to claim 6, wherein the preset offset frequency value is half of the symbol rate value of the optical transmission signal.

8. A coherent detection device, comprising:

an optical coupling module configured to acquire an optical transmission signal and a local oscillator signal and couple the optical transmission signal and the local oscillator signal to obtain only one coupled signal, wherein a frequency value of the local oscillator signal differs from a frequency value of the optical transmission signal by a preset offset frequency value, the preset offset frequency value being smaller than a symbol rate value of the optical transmission signal, wherein the coupled signal has values on both an in-phase component and a quadrature component;

an optoelectronic detection module connected to the optical coupling module and configured to convert the coupled signal into an analog signal;

an analog-to-digital conversion module connected to the optoelectronic detection module and configured to sample the analog signal according to a preset sampling frequency value and convert the analog signal into a plurality of digital signals, wherein the plurality of digital signals comprises the in-phase component and the quadrature component; and a digital processing module connected to the analog-to-digital conversion module and configured to process two digital signals among the plurality of digital signals so that a phase difference between the two digital signals is 90 degrees, wherein the two digital signals are derived from a same signal symbol in the optical transmission signal.

9. The coherent detection device according to claim 8, further comprising a polarization module connected to the optical coupling module, the polarization module being configured to adjust the polarization state of a received first optical source signal to obtain the optical transmission signal, and transmit the optical transmission signal to the optical coupling module.

10. The coherent detection device according to claim 9, further comprising a local oscillator module, the local oscillator module being configured to output the local oscillator signal.

11. The coherent detection device according to claim 10, wherein the optical coupling module comprises a first optical coupling unit and a second optical coupling unit, and the polarization module comprises a first polarization beam splitting unit and a second polarization beam splitting unit, the first polarization beam splitting unit being separately connected to the first optical coupling unit and the second optical coupling unit, and the second polarization beam splitting unit being separately connected to the local oscillator module, the first optical coupling unit, and the second optical coupling unit;

the first polarization beam splitting unit is configured to perform beam splitting processing on the first optical source signal to obtain the optical transmission signal comprising a first optical signal and a second optical signal, and transmit the first optical signal to the first optical coupling unit and the second optical signal to the second optical coupling unit, wherein the polarization state of the first optical signal is orthogonal to the polarization state of the second optical signal; and the second polarization beam splitting unit is configured to receive the local oscillator signal, divide the local oscillator signal into a first local oscillator signal and a second local oscillator signal, and transmit the first local oscillator signal to the first optical coupling unit and the second local oscillator signal to the second optical coupling unit, wherein the polarization state of the first local oscillator signal is orthogonal to the polarization state of the second local oscillator signal.

12. An optical transmission system, comprising a coherent detection device, wherein the coherent detection device comprises:

an optical coupling module configured to acquire an optical transmission signal and a local oscillator signal and couple the optical transmission signal and the local oscillator signal to obtain only one coupled signal, wherein a frequency value of the local oscillator signal differs from a frequency value of the optical transmission signal by a preset offset frequency value, the preset offset frequency value being smaller than a symbol rate value of the optical transmission signal, wherein the coupled signal has values on both an in-phase component and a quadrature component;

an optoelectronic detection module connected to the optical coupling module and configured to convert the coupled signal into an analog signal;

an analog-to-digital conversion module connected to the optoelectronic detection module and configured to sample the analog signal according to a preset sampling frequency value and convert the analog signal into a plurality of digital signals, wherein the plurality of digital signals comprises the in-phase component and the quadrature component; and a digital processing module connected to the analog-to-digital conversion module and configured to process two digital signals among the plurality of digital signals so that a phase difference between the two digital signals is 90 degrees, wherein the two digital signals are derived from a same signal symbol in the optical transmission signal.

13. The optical transmission system according to claim 12, further comprising:

an optical signal transmitting device, wherein the optical signal transmitting device is connected to the coherent detection device through an optical fiber; and the optical signal transmitting device comprises a signal module configured to output an initial optical signal and an intensity modulation module connected to the signal module, the intensity modulation module being configured to perform intensity modulation on the initial optical signal to obtain a first optical source signal.

14. The optical transmission system according to claim 13, wherein the optical signal transmitting device further comprises a modulation signal generating module, a third polarization beam splitting unit, and a polarization beam combining unit;

the intensity modulation module comprises a first modulation module and a second modulation module, and the signal module is separately connected to the first modulation module and the second modulation module; and the modulation signal generating module is connected to the third polarization beam splitting unit, and the first modulation module and the second modulation module are connected in parallel between the third polarization beam splitting unit and the polarization beam combining unit; and the first modulation module is configured to generate a first optical signal; the second modulation module is configured to generate a second optical signal; and the polarization beam combining unit is configured to combine the first optical signal and the second optical signal into the first optical source signal.

15. The optical transmission system according to claim 12, further comprising: an optical signal transmitting device, wherein the optical signal transmitting device is connected to the coherent detection device through an optical fiber; and the optical signal transmitting device comprises a signal module configured to output an initial optical signal, a modulation signal generating module, a third polarization beam splitting unit, a polarization beam combining unit, and an intensity modulation module;

the intensity modulation module comprises a third modulation module and a frequency offset unit, and the signal module is connected to the third modulation module; the modulation signal generating module is connected to the third polarization beam splitting unit, and the third modulation module and the frequency offset unit are connected in parallel between the third polarization beam splitting unit and the polarization beam combining unit;

the third modulation module is configured to generate the optical transmission signal; the frequency offset unit is configured to perform frequency adjustment on a modulation signal from the modulation signal generating module to obtain the local oscillator signal; and the polarization beam combining unit is configured to combine the optical transmission signal and the local oscillator signal into a second optical source signal.

* * * * *